(12) United States Patent
Mashio et al.

(10) Patent No.: US 11,423,494 B2
(45) Date of Patent: Aug. 23, 2022

(54) PLANT ASSISTANCE ASSESSMENT SYSTEM AND PLANT ASSISTANCE ASSESSMENT METHOD

(71) Applicant: MITSUBISHI HEAVY INDUSTRIES, LTD., Tokyo (JP)

(72) Inventors: Kenji Mashio, Tokyo (JP); Takae Yamashita, Tokyo (JP); Susumu Shiizuka, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 69 days.

(21) Appl. No.: 16/623,866

(22) PCT Filed: Apr. 10, 2018

(86) PCT No.: PCT/JP2018/015106
§ 371 (c)(1),
(2) Date: Dec. 18, 2019

(87) PCT Pub. No.: WO2018/235399
PCT Pub. Date: Dec. 27, 2018

(65) Prior Publication Data
US 2020/0143487 A1     May 7, 2020

(30) Foreign Application Priority Data
Jun. 21, 2017  (JP) .............................. JP2017-121474

(51) Int. Cl.
*G06Q 50/04*     (2012.01)
*G05B 23/02*     (2006.01)
(Continued)

(52) U.S. Cl.
CPC ......... *G06Q 50/04* (2013.01); *G05B 23/0205* (2013.01); *G06Q 10/0635* (2013.01); *G06Q 10/20* (2013.01); *G06Q 50/265* (2013.01)

(58) Field of Classification Search
CPC .... G06Q 50/04; G06Q 10/0635; G06Q 10/20; G06Q 50/265; G05B 23/0205; G06N 5/045
See application file for complete search history.

(56) References Cited

U.S. PATENT DOCUMENTS 4,632,802 A * 12/1986 Herbst .................... G21D 3/04
                                                        376/216
7,191,108 B2 * 3/2007 Pappone ............... G21C 17/00
                                                        703/2
(Continued)

FOREIGN PATENT DOCUMENTS

JP         7-261825 A    10/1995
JP         3968656 B2 *   2/2003   ............ G05B 23/02
(Continued)

OTHER PUBLICATIONS

Shen et al. 1994 A cognitive model of nuclear power plant operation response during abnormal conditions, University of Maryland, pp. 4-24. (Year: 1994).*

(Continued)

*Primary Examiner* — Rutao Wu
*Assistant Examiner* — Stephen S Swartz
(74) *Attorney, Agent, or Firm* — WHDA, LLP (57) ABSTRACT

A plant assistance assessment system 100 that assesses a plurality of nuclear power generation plants 110 includes an abnormality sign monitoring system 121 that monitors an abnormality sign in a plant, based on plant data of the nuclear power generation plants; a fault diagnosis system 122 that performs fault diagnosis on each of devices in the plants, based on abnormality sign detection information; a progress prediction system 123 that simulates progress of the plants, based on fault information; an abnormal phenomenon specification system 124 that specifies a potential abnormal phenomenon in the plants, based on progress prediction information; a risk assessment system 125 that assesses a risk of a fault in the devices in the plants in a probabilistic manner; and an abnormal phenomenon assessment system 126 that assesses likelihood of occurrence of an abnormal phenomenon, based on abnormal phenomenon information and fault probability information.

3 Claims, 3 Drawing Sheets

(51) Int. Cl.
  *G06Q 10/06*    (2012.01)
  *G06Q 10/00*    (2012.01)
  *G06Q 50/26*    (2012.01)

(56) References Cited

U.S. PATENT DOCUMENTS

| | | | |
|---|---|---|---|
| 2006/0095232 A1* | 5/2006 | Purdy | G05B 23/0221 |
| | | | 702/185 |
| 2006/0224325 A1* | 10/2006 | Conway | G16H 40/40 |
| | | | 600/300 |
| 2007/0220368 A1 | 9/2007 | Jaw et al. | |
| 2011/0307743 A1 | 12/2011 | Khalak et al. | |
| 2012/0317058 A1* | 12/2012 | Abhulimen | G06N 3/0427 |
| | | | 706/2 |
| 2013/0282336 A1 | 10/2013 | Maeda et al. | |

FOREIGN PATENT DOCUMENTS

| | | | | |
|---|---|---|---|---|
| JP | 2004-240642 A | | 8/2004 | |
| JP | 2012-137934 A | | 7/2012 | |
| JP | 2017-97628 A | | 6/2017 | |
| JP | WO2018123144 A1 | * | 9/2017 | G05B 23/02 |
| KR | 2010-0030351 A | * | 3/2010 | G06Q 50/26 |

OTHER PUBLICATIONS

International Search Report dated Jul. 10, 2018, issued in counterpart application No. PCT/JP2018/015106 (1 page).
Extended (Supplementary) European Search Report dated Apr. 15, 2020, issued in counterpart application No. 18821183.3. (9 pages).

\* cited by examiner

PLANT ASSISTANCE ASSESSMENT SYSTEM AND PLANT ASSISTANCE ASSESSMENT METHOD

FIELD

The present invention relates to a plant assistance assessment system and a plant assistance assessment method for assessing a plant.

BACKGROUND

Conventionally, an abnormality detection and diagnosis system that detects abnormality or a sign of abnormality in a facility such as a plant, and that diagnoses the facility has been disclosed (for example, see Patent Literature 1). This system includes a database unit in which pieces of maintenance history information of the plant or the facility are accumulated. By connecting abnormality detection information detected by a sensor provided in the facility with the maintenance history information, the system outputs a work instruction for performing the required maintenance on the generated abnormality or a sign of abnormality.

CITATION LIST

Patent Literature

Patent Literature 1: Japanese Patent Application Laid-open No. 2012-137934

SUMMARY

Technical Problem

In this example, when the abnormality detection and diagnosis system as described in Patent Literature 1 is applied to a plant such as a power generation plant, for example, the abnormality detection and diagnosis system is installed on a site where the plant is provided. Consequently, the abnormality detection and diagnosis system is individually installed in a single plant. Moreover, the abnormality detection and diagnosis system detects abnormality or a sign of abnormality (hereinafter, simply referred to as an abnormality sign) in the plant, on the basis of the real-time abnormality detection information acquired from the single plant.

However, with the abnormality detection and diagnosis system described in Patent Literature 1, the abnormality detection information used for detecting an abnormality sign can only be acquired from a single plant. Consequently, the abnormality detection and diagnosis system cannot acquire the abnormality detection information from the other plant, and cannot integrally manage a plurality of the plants. Moreover, because resources for the abnormal detection information are small, it is difficult to improve the reliability of detecting an abnormality sign. Furthermore, with the abnormality detection and diagnosis system described in Patent Literature 1, an abnormality sign is detected on the basis of the real-time abnormality detection information. Thus, although it is possible to detect an abnormality sign at the present time point, it is difficult to predict an abnormality sign at the future time point. Thus, the initial response based on the abnormality detection may be delayed.

Consequently, an object of the present invention is to provide a plant assistance assessment system and a plant assistance assessment method that can reliably assess the occurrence of an abnormal phenomenon so as the initial response can be performed in a suitable manner.

Solution to Problem

A plant assistance assessment system of the present invention acquires plant data from a plurality of plants via a network communicable between each of the plants and a plant assistance facility provided at a location different from a location of the plant, assesses the plant based on the plant data, and is provided in the plant assistance facility. The plant assistance assessment system includes an abnormality sign monitoring system that monitors an abnormality sign in the plant based on the plant data; a fault diagnosis system that performs fault diagnosis on each of devices provided in the plant, based on abnormality sign detection information that is information on an abnormality sign detected by the abnormality sign monitoring system; a progress prediction system that simulates progress of the plant, based on fault information that is information on a fault in the device diagnosed by the fault diagnosis system, and that predicts the progress of the plant; an abnormal phenomenon specification system that specifies a potential abnormal phenomenon in the plant, based on progress prediction information that is information on the progress of the plant predicted by the progress prediction system; a risk assessment system that assesses a risk of a fault in each of devices provided in the plant in a probabilistic manner; and an abnormal phenomenon assessment system that assesses likelihood of occurrence of an abnormal phenomenon, based on abnormal phenomenon information that is information on the abnormal phenomenon specified by the abnormal phenomenon specification system, and fault probability information that is information on fault probability of the device assessed by the risk assessment system.

Further, a plant assistance assessment method of acquiring plant data from a plurality of plants via a network communicable between each of the plants and a plant assistance facility provided at a location different from a location of the plant, and assessing the plant based on the plant data. The plant assistance assessment method includes an abnormality sign monitoring step of monitoring an abnormality sign in the plant based on the plant data, and when the abnormality sign is detected, generating abnormality sign detection information that is information on the detected abnormality sign; a fault diagnosis step of performing fault diagnosis on each of devices provided in the plant, based on the abnormality sign detection information generated at the abnormality sign monitoring step, and generating fault information that is information on a fault in the device; a progress prediction step of simulating progress of the plant, based on the fault information generated at the fault diagnosis step, predicting the progress of the plant, and generating progress prediction information that is information on the predicted progress of the plant; an abnormal phenomenon specification step of specifying a potential abnormal phenomenon in the plant, based on the progress prediction information generated at the progress prediction step, and generating abnormal phenomenon information that is information on the specified abnormal phenomenon; a risk assessment step of assessing a risk of a fault in the device provided in the plant in a probabilistic manner, and generating fault probability information that is information on assessed fault probability of the device; and an abnormal phenomenon assessment step of assessing likelihood of occurrence of an abnormal phenomenon, based on the abnormal phenomenon information generated at the abnormal phenomenon specification step and the fault probability information generated at the risk assessment step.

With these configurations, the abnormality sign monitoring system can monitor the abnormality sign, on the basis of the plant data acquired from the plants. Consequently, it is possible to integrally manage the plants. Moreover, because the abnormality sign monitoring system can acquire the plant data from the plants, resources for monitoring the abnormality sign are increased. Consequently, it is possible to reliably detect the abnormality sign. Moreover, the progress prediction system simulates the progress of the plant, on the basis of the fault information of the device that is diagnosed on the basis of the abnormality sign. Consequently, the abnormal phenomenon specification system can predict the occurrence of an abnormal phenomenon in future. In addition, to assess the abnormal phenomenon, the abnormal phenomenon assessment system can assess the likelihood of occurrence of an abnormal phenomenon, on the basis of the abnormal phenomenon information and the fault probability information. Consequently, it is possible to accurately detect an abnormality sign at the future time point.

Further, in the plant assistance assessment system, it is preferable that the risk assessment system acquires the fault information from the fault diagnosis system, re-assesses the risk of a fault in the device, and updates the fault probability information.

With this configuration, the fault probability information can be updated to the latest version. Consequently, it is possible to accurately assess the likelihood of occurrence of an abnormal phenomenon in the plant.

Further, in the plant assistance assessment system, it is preferable that the risk assessment system includes a list of devices in which a device important to safety for the plant is extracted from the devices provided in the plant, selects the device corresponding to the fault information acquired from the fault diagnosis system based on the list of devices, and re-assesses the risk of a fault in the selected device.

With this configuration, it is possible to select a device important to safety on the basis of the list of devices, from the devices included in the fault information, and assess the risk of a fault in the device in a probabilistic manner. Consequently, there is no need to assess the risk in all the devices, and it is possible to efficiently update the fault probability information.

Further, in the plant assistance assessment system, it is preferable that the abnormal phenomenon assessment system determines whether an emergency response is required against the abnormal phenomenon, based on the assessed likelihood of occurrence of the abnormal phenomenon, and when determining that the emergency response is required, the abnormal phenomenon assessment system outputs notification information that is information on the abnormal phenomenon to at least one of the plant and a facility for managing the plant.

With this configuration, it is possible to notify the notification information to at least one of the plant and the facility that manages the plant. Consequently, it is possible to make an emergency response to the plant.

Further, in the plant assistance assessment system, it is preferable that the abnormal phenomenon assessment system determines whether an emergency response is required against the abnormal phenomenon, based on the assessed likelihood of occurrence of the abnormal phenomenon, and when determining that the emergency response is not required, the abnormal phenomenon assessment system generates device replacement information for urging a user to replace the device that is causing the abnormal phenomenon to occur.

With this configuration, even when the emergency response is not required, it is possible to urge a user to replace the device through the device replacement information. Consequently, by replacing the device, it is possible to reduce the likelihood of occurrence of an abnormal phenomenon.

DESCRIPTION OF EMBODIMENTS

Hereinafter, an embodiment according to the present invention will be described in detail with reference to the accompanying drawings. However, the present invention is not limited to this embodiment. Moreover, components in the embodiment described below include components that can be easily replaced by those skilled in the art, or components substantially the same as those components. Furthermore, the components described below can be combined with one another as appropriate. Still furthermore, when there are a plurality of embodiments, the embodiments may be combined with one another.

EMBODIMENT

Figure 1:
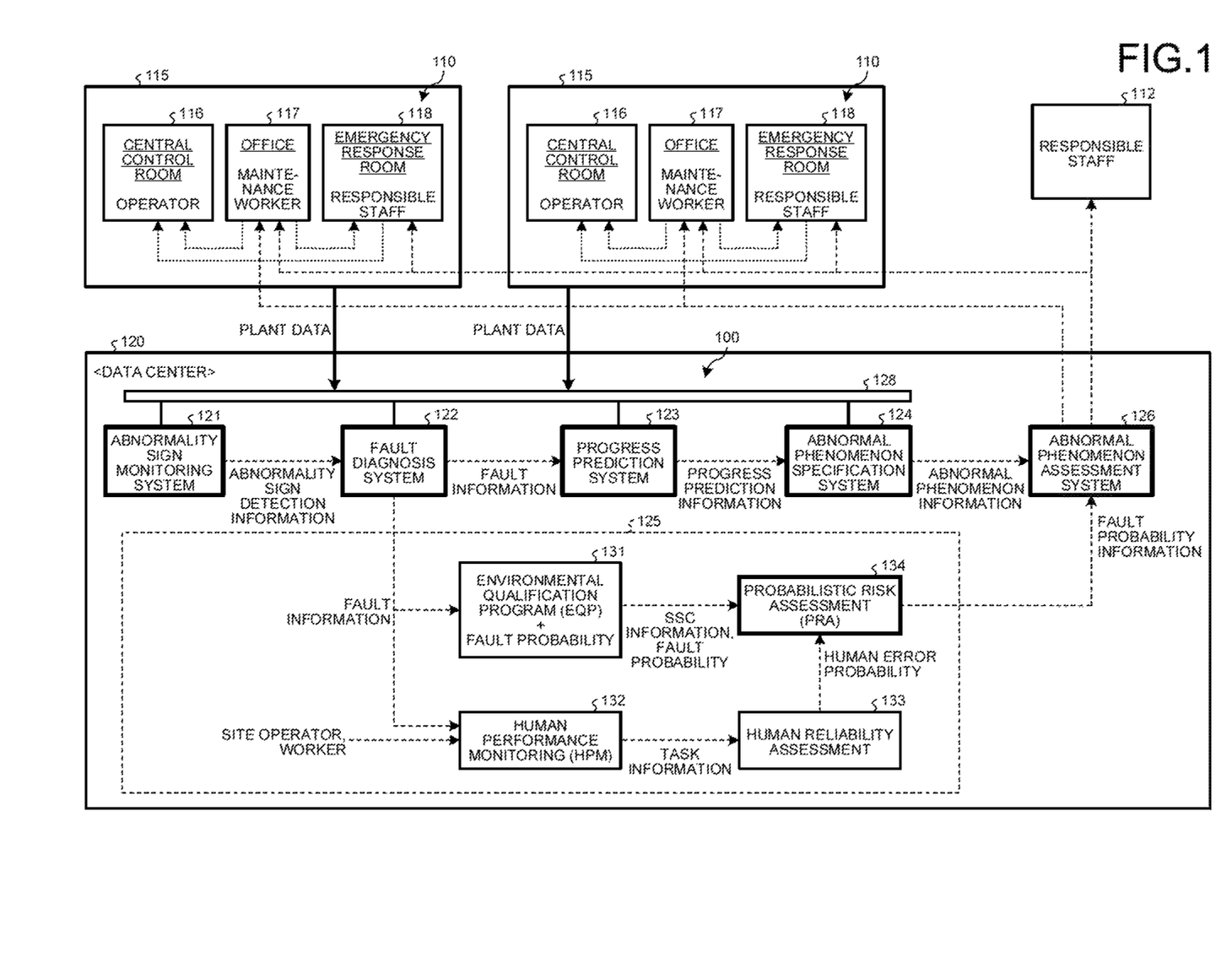
FIG. 1 is a schematic configuration diagram of a plant assistance assessment system according to the present embodiment.

FIG. 1 is a schematic configuration diagram of a plant assistance assessment system according to the present embodiment. A plant assistance assessment system 100 is a system that aids the operation of a plurality of plants and that assesses the operation state of the plants. For example, a nuclear power plant is applied as the plant. For example, the nuclear power plant is a nuclear power generation plant 110 having a nuclear reactor, and each of a plurality of the nuclear power generation plants 110 is provided in a corresponding site 115. The present embodiment is applied to the nuclear power generation plant 110 serving as the plant. However, the configuration is not limited thereto, and the present embodiment may also be applied to another plant (for example, a chemical plant, a thermal power generation plant, or the like) other than the nuclear power plant.

As illustrated in FIG. 1, the nuclear power generation plant 110 includes a central control room 116 for controlling the operation of the entire plant, an office 117, and an emergency response room 118. An operator who operates the plant is posted in the central control room 116, and a maintenance worker who performs the maintenance work of the plant is posted in the office 117. Moreover, a responsible staff who carries out emergency response at the time of emergency in the plant is posted in the emergency response room 118. Although details will be described below, notification information generated in the plant assistance assessment system 100 is transmitted to the office 117 and the emergency response room 118.

The plant assistance assessment system 100 is disposed in a data center 120 serving as a plant assistance facility provided at a location different from that of the nuclear power generation plants 110. In other words, the data center 120 is provided at a location away from the sites 115 where the respective nuclear power generation plants 110 are provided. Consequently, the plant assistance assessment system 100 is placed away from the nuclear power generation plants 110, and the plant assistance assessment system 100 and the nuclear power generation plants 110 perform communication via a network.

Upon acquiring plant data from each of the nuclear power generation plants 110, and on the basis of the plant data, the plant assistance assessment system 100 assesses the operation state of each of the nuclear power generation plants 110. The plant assistance assessment system 100 acquires a plurality of measurement parameters output from a plurality of measurement instruments provided in the nuclear power generation plant 110, as plant data. In this example, communication relating to the plant data is one way from the nuclear power generation plants 110 to the plant assistance assessment system 100. While communication from the nuclear power generation plants 110 to the plant assistance assessment system 100 is possible, communication from the plant assistance assessment system 100 to the nuclear power generation plants 110 is not possible. To output the notification information, which will be described below, from the plant assistance assessment system 100 to the nuclear power generation plants 110, another communication channel different from the communication channel of the plant data is used.

As illustrated in FIG. 1, the plant assistance assessment system 100 includes an abnormality sign monitoring system 121, a fault diagnosis system 122, a progress prediction system 123, an abnormal phenomenon specification system 124, a risk assessment system 125, and an abnormal phenomenon assessment system 126. Moreover, the abnormality sign monitoring system 121, the fault diagnosis system 122, the progress prediction system 123, and the abnormal phenomenon specification system 124 are communicably connected to each other via an internal bus 128. The plant data is input via the internal bus 128. Furthermore, the risk assessment system 125 is communicably connected to the fault diagnosis system 122 and the abnormal phenomenon assessment system 126. Various types of information are input to the risk assessment system 125 from the fault diagnosis system 122, and the risk assessment system 125 outputs various types of information to the abnormal phenomenon assessment system 126. Still furthermore, the abnormal phenomenon assessment system 126 is communicably connected to the abnormal phenomenon specification system 124 and the risk assessment system 125, and is communicably connected to the nuclear power generation plants 110. Various types of information are input to the abnormal phenomenon assessment system 126 from the abnormal phenomenon specification system 124 and the risk assessment system 125, and the abnormal phenomenon assessment system 126 outputs various types of information to the nuclear power generation plants 110. A plant operation company 112 serving as a facility for managing the nuclear power generation plant 110 is separately and communicably connected to the abnormal phenomenon assessment system 126. The abnormal phenomenon assessment system 126 outputs various types of information to the plant operation company 112.

The abnormality sign monitoring system 121 is a system that monitors an abnormality sign in the nuclear power generation plant 110 on the basis of the plant data. The abnormality sign monitoring system 121 acquires the plant data via the internal bus 128. Moreover, the abnormality sign monitoring system 121 compares between the past plant data and the acquired current plant data. When the current plant data is deviated from the normal range set on the basis of the past plant data, the abnormality sign monitoring system 121 detects an abnormality sign in the nuclear power generation plant 110. The abnormality sign monitoring system 121 is connected to the internal bus 128. The abnormality sign monitoring system 121 can generate abnormality sign detection information that is information on the detected abnormality sign, and can output the generated abnormality sign detection information to the fault diagnosis system 122.

The fault diagnosis system 122 is a system that performs fault diagnosis on each of a plurality of devices provided in the nuclear power generation plant 110, on the basis of the abnormality sign detection information. The fault diagnosis system 122 is connected to the internal bus 128, and can acquire the abnormality sign detection information output from the abnormality sign monitoring system 121 via the internal bus 128. On the basis of the abnormality sign detection information, the fault diagnosis system 122 specifies the facility or the device that is causing the abnormality, from various facilities and various devices that configure the nuclear power generation plant 110. The fault diagnosis system 122 can then generate fault information that is information on the fault in the specified facility or device, and can output the generated fault information to the progress prediction system 123.

Upon generating the fault information on the basis of the plant data acquired from a single nuclear power generation plant 110, the fault diagnosis system 122 shares the fault information with the similar nuclear power generation plant 110 and the nuclear power generation plant 110 that is using the same device as that of the failed device. Consequently, the fault information is developed horizontally in the nuclear power generation plants 110.

The progress prediction system 123 is a system that simulates the temporal progress of the nuclear power generation plant 110 on the basis of the fault information, and that predicts the progress of the nuclear power generation plants 110. The progress prediction system 123 is connected to the internal bus 128, and can acquire the fault information output from the fault diagnosis system 122 via the internal bus 128. The progress prediction system 123 simulates the progress of various facilities and various devices of the nuclear power generation plant 110, on the basis of the fault information. The progress prediction system 123 then predicts the progress of the fault and the presence of an abnormal phenomenon in the various facilities and various devices of the nuclear power generation plant 110. The progress prediction system 123 can generate progress prediction information that is information on the progress of the nuclear power generation plant 110, and can output the generated progress prediction information to the abnormal phenomenon specification system 124.

The abnormal phenomenon specification system 124 is a system that specifies a potential abnormal phenomenon in the nuclear power generation plant 110, on the basis of the progress prediction information. The abnormal phenomenon specification system 124 is connected to the internal bus 128, and can acquire the progress prediction information output from the progress prediction system 123 via the internal bus 128. The abnormal phenomenon specification system 124 can specify the potential abnormal phenomenon on the basis of the progress prediction information, and can aid the operation of the nuclear power generation plant 110 in an emergency against the specified abnormal phenomenon. The abnormal phenomenon specification system 124 can then generate abnormal phenomenon information that is information on the specified abnormal phenomenon, and can output the generated abnormal phenomenon information to the abnormal phenomenon assessment system 126.

The risk assessment system 125 is a system that assesses the risk of a fault in each device provided in the nuclear power generation plant 110 in a probabilistic manner (probabilistic risk assessment (PRA)), on the basis of the fault information. The risk assessment system 125 is connected to the fault diagnosis system 122, and acquires the fault information output from the fault diagnosis system 122. The risk assessment system 125 assesses the risk generated in the nuclear power generation plant 110, by making the facility including the facility with an abnormality sign to standby or to be removed, on the basis of the fault information. The risk assessment system 125 also assesses the risk generated in the nuclear power generation plant 110 by manual operation by an operator. Moreover, by assessing the risk generated in the nuclear power generation plant 110, the risk assessment system 125 can assess the fault probability of the device. The risk assessment system 125 can also generate fault probability information that is information on the assessed fault probability of the device, and can output the generated fault probability information to the abnormal phenomenon assessment system 126. The risk assessment system 125 can assess a reactor core damage probability, a containment vessel damage probability, and the like, in addition to the fault probability of the device, by assessing the risk generated in the nuclear power generation plant 110.

More particularly, the risk assessment system 125 includes an environmental qualification program (EQP) 131, a human performance monitoring (HPM) 132, a human reliability assessment unit 133, and a probabilistic risk assessment unit 134.

The EQP 131 includes a list of devices (may also be referred to as a list of structures, systems and components (SSC)) in which devices important to safety for the nuclear power generation plant 110 are extracted from the devices provided in the nuclear power generation plant 110. The EQP 131 acquires the fault information from the fault diagnosis system 122, and selects whether the device corresponding to the fault information is the device included in the list of devices. When the device is included in the list of devices, the EQP 131 re-assesses the risk of a fault in the selected device. The EQP 131 can output the information on the list of devices and the information on the re-assessed fault probability of the device, to the probabilistic risk assessment unit 134.

The HPM 132 analyzes the operation task of an operator who operates the nuclear power generation plant 110. The HPM 132 acquires the fault information from the fault diagnosis system 122, acquires the operation task of the operator, and analyzes the operation task on the basis of the information. The HPM 132 can then generate task information that is information on the analyzed operation task, and can output the generated task information to the human reliability assessment unit 133.

The human reliability assessment unit 133 assesses the human error, by analyzing the operation task using the information on human error caused by the operator. The human reliability assessment unit 133 acquires the task information from the HPM 132, and assesses the human error probability of the operator on the basis of the task information. The human reliability assessment unit 133 can then generate information on the human error probability of the operator, and can output the generated information on the human error probability to the probabilistic risk assessment unit 134.

The probabilistic risk assessment unit 134 assesses the risk in the nuclear power generation plant 110, on the basis of the information on the fault probability of the device re-assessed in the EQP 131, the information on the list of devices, and the information on the human error probability of the operator assessed by the human reliability assessment unit 133. Consequently, the probabilistic risk assessment unit 134 assesses the fault probability of the device. The probabilistic risk assessment unit 134 can then generate fault probability information, and can output the generated fault probability information to the abnormal phenomenon assessment system 126.

The risk assessment system 125 updates the fault probability information in real time, by re-assessing the risk of a fault in the device, every time the fault information is acquired and every time the operation task of the operator is acquired.

The abnormal phenomenon assessment system 126 is a system that assesses the likelihood of occurrence of an abnormal phenomenon, on the basis of the abnormal phenomenon information from the abnormal phenomenon specification system 124, and the fault probability information from the risk assessment system 125. The abnormal phenomenon assessment system 126 determines whether an emergency response is required against the abnormal phenomenon, on the basis of the assessed likelihood of occurrence of the abnormal phenomenon. When it is determined that the emergency response is required, the abnormal phenomenon assessment system 126 outputs notification information that is information on an abnormal phenomenon, to the nuclear power generation plant 110 and the plant operation company 112. In other words, in the abnormal phenomenon assessment system 126, a threshold for determining whether an emergency response is required is set. When the assessed likelihood of occurrence of the abnormal phenomenon is equal to or more than the threshold, the abnormal phenomenon assessment system 126 outputs notification information indicating that an emergency response is required. For example, the notification information includes information on the abnormal phenomenon, information on the emergency response measures against the abnormal phenomenon, and the like. On the other hand, when it is determined that an emergency response is not required, in other words, when the assessed likelihood of occurrence of the abnormal phenomenon is smaller than the threshold, the abnormal phenomenon assessment system 126 generates device replacement information for urging a user to replace the device that is causing the abnormal phenomenon to occur. For example, the abnormal phenomenon assessment system 126 outputs the device replacement information to the office 117 and the like that performs maintenance.

Next, with reference to FIG. 2 and FIG. 3, a plant assistance assessment method of the nuclear power generation plant 110 will be described.

Figure 2:
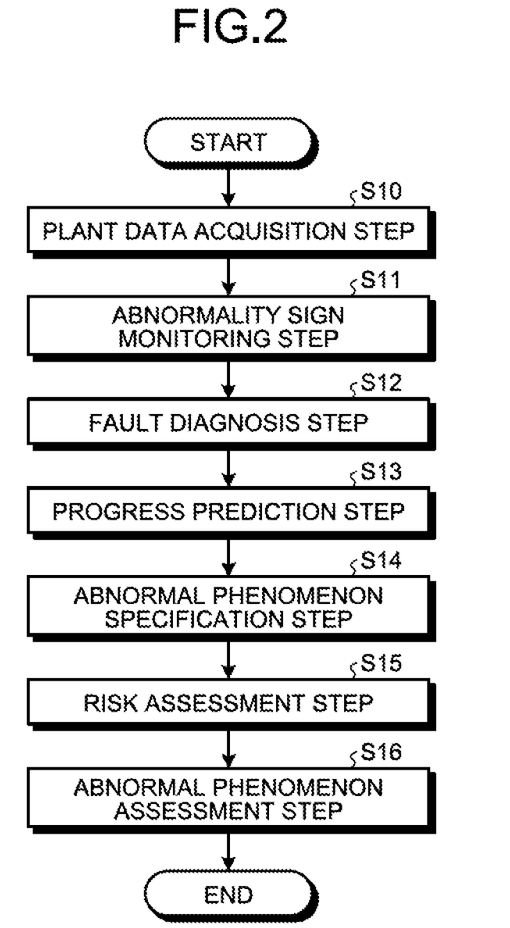
FIG. 2 is a flowchart of a plant assistance assessment method according to the present embodiment.
Figure 3:
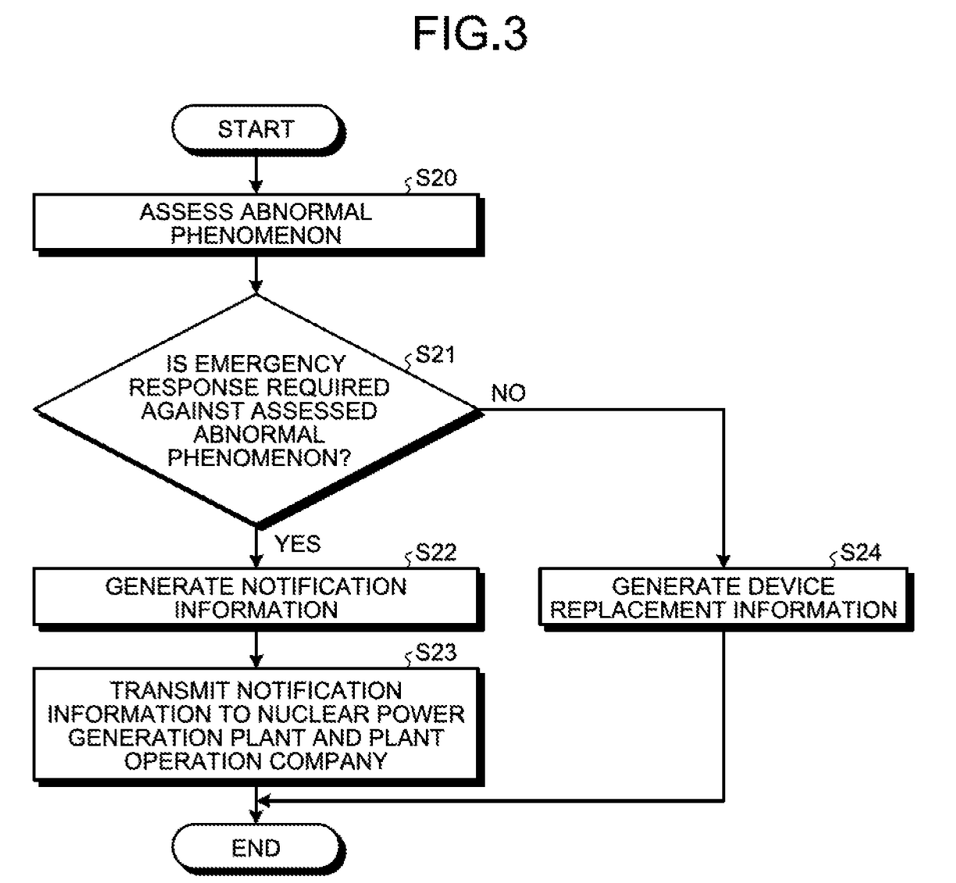
FIG. 3 is a flowchart of an abnormal phenomenon assessment step of the present embodiment.

As illustrated in FIG. 2, to assess the operation state of the nuclear power generation plant 110, the plant assistance assessment system 100 first acquires plant data from the nuclear power generation plants 110 (step S10: plant data acquisition step). When the plant assistance assessment system 100 acquires the plant data, the abnormality sign monitoring system 121 monitors an abnormality sign in the nuclear power generation plant 110 on the basis of the acquired plant data. When the abnormality sign is detected, the abnormality sign monitoring system 121 generates abnormality sign detection information that is information on the detected abnormality sign, and outputs the generated abnormality sign detection information to the fault diagnosis system 122 (step S11: abnormality sign monitoring step).

Then, when the fault diagnosis system 122 acquires the abnormality sign detection information, the fault diagnosis system 122 performs fault diagnosis on each device provided in the nuclear power generation plant 110, on the basis of the acquired abnormality sign detection information. The fault diagnosis system 122 then generates fault information that is information on the fault in the device, and outputs the generated fault information to the progress prediction system 123 and the risk assessment system 125 (step S12: fault diagnosis step). When the progress prediction system 123 acquires the fault information, the progress prediction system 123 simulates the progress of the operation state of the nuclear power generation plant 110 on the basis of the acquired fault information, and predicts the progress of the nuclear power generation plant 110. The progress prediction system 123 then generates progress prediction information that is information on the predicted progress of the nuclear power generation plant 110, and outputs the generated progress prediction information to the abnormal phenomenon specification system 124 (step S13: progress prediction step).

Next, when the abnormal phenomenon specification system 124 acquires the progress prediction information, the abnormal phenomenon specification system 124 specifies the potential abnormal phenomenon in the nuclear power generation plant 110, on the basis of the acquired progress prediction information. The abnormal phenomenon specification system 124 then generates abnormal phenomenon information that is information on the specified abnormal phenomenon, and outputs the generated abnormal phenomenon information to the abnormal phenomenon assessment system 126 (step S14: abnormal phenomenon specification step). Moreover, when the risk assessment system 125 acquires the fault information, the risk assessment system 125 assesses the risk of a fault in each device provided in the nuclear power generation plant 110 in a probabilistic manner, on the basis of the acquired fault information. The risk assessment system 125 then generates fault probability information that is information on the assessed fault probability of the device, and outputs the generated fault probability information to the abnormal phenomenon assessment system 126 (step S15: risk assessment step).

When the abnormal phenomenon assessment system 126 acquires the abnormal phenomenon information and the fault probability information, the abnormal phenomenon assessment system 126 assesses the likelihood of occurrence of an abnormal phenomenon (step S16: abnormal phenomenon assessment step).

Next, with reference to FIG. 3, an abnormal phenomenon assessment step will be described. Upon assessing the likelihood of occurrence of an abnormal phenomenon (step S20), the abnormal phenomenon assessment system 126 determines whether an emergency response is required against the assessed abnormal phenomenon (step S21). If it is determined that the emergency response is required (Yes at step S21), the abnormal phenomenon assessment system 126 generates notification information (step S22), and transmits the generated notification information to the nuclear power generation plant 110 and the plant operation company 112 (step S23). On the other hand, if it is determined that an emergency response is not required (No at step S21), the abnormal phenomenon assessment system 126 generates device replacement information (step S24), and transmits the device replacement information to the office 117 where the maintenance worker who performs the maintenance work is posted, for example.

In this manner, with the present embodiment, the abnormality sign monitoring system 121 can monitor the abnormality sign, on the basis of the plant data acquired from the nuclear power generation plants 110. Consequently, it is possible to integrally manage the nuclear power generation plants 110. Moreover, the abnormality sign monitoring system 121 can acquire the plant data from the nuclear power generation plants 110. Because resources for monitoring the abnormality sign are increased, it is possible to reliably detect the abnormality sign. Furthermore, because the progress prediction system 123 simulates the progress of the nuclear power generation plant 110, on the basis of the fault information of the device that is diagnosed on the basis of the abnormality sign, the abnormal phenomenon specification system 124 can predict the occurrence of an abnormal phenomenon in future. In addition, to assess the abnormal phenomenon, the abnormal phenomenon assessment system 126 can assess the likelihood of occurrence of an abnormal phenomenon, on the basis of the abnormal phenomenon information and the fault probability information. Thus, the plant assistance assessment system 100 can accurately detect an abnormality sign at the future time point.

Still furthermore, with the present embodiment, the risk assessment system 125 can re-assess the risk of a fault in the device every time the fault information is acquired, and update the fault probability information. Consequently, it is possible to accurately assess the likelihood of occurrence of an abnormal phenomenon in the nuclear power generation plant 110.

Still furthermore, with the present embodiment, the risk assessment system 125 can select the device important to safety on the basis of the list of devices, from the devices included in the fault information, and assess the risk of a fault in the selected device in a probabilistic manner. Thus, there is no need to assess the risk in all the devices, and it is possible to efficiently update the fault probability information.

Still furthermore, with the present embodiment, it is possible to notify the notification information to the nuclear power generation plant 110 and the plant operation company 112. Consequently, it is possible to make an emergency response to the nuclear power generation plant 110.

Still furthermore, with the present embodiment, even when an emergency response is not required, it is possible to urge a user to replace the device through the device replacement information. Consequently, by replacing the device, it is possible to reduce the likelihood of occurrence of an abnormal phenomenon.

REFERENCE SIGNS LIST

100 Plant assistance assessment system
110 Nuclear power generation plant
112 Plant operation company
115 Site
116 Central control room
117 Office
118 Emergency response room
120 Data center
121 Abnormality sign monitoring system
122 Fault diagnosis system
123 Progress prediction system
124 Abnormal phenomenon specification system 125 Risk assessment system
126 Abnormal phenomenon assessment system
128 Internal bus
131 EQP
132 HPM
133 Human reliability assessment unit
134 Probabilistic risk assessment unit

The invention claimed is:

1. A plant assistance assessment system that acquires plant data from a plurality of plants via a network communicable between each of the plants and a plant assistance facility provided at a location different from a location of the plant, that assesses the plant based on the plant data, and that is provided in the plant assistance facility, the plant assistance assessment system comprising:
   an abnormality sign monitoring system that monitors an abnormality sign in the plant based on the plant data;
   a fault diagnosis system that performs fault diagnosis on each of devices provided in the plant, based on abnormality sign detection information that is information on an abnormality sign detected by the abnormality sign monitoring system;
   a progress prediction system that simulates progress of the plant, based on fault information that is information on a fault in the device diagnosed by the fault diagnosis system, and that predicts the progress of the plant;
   an abnormal phenomenon specification system that specifies a potential abnormal phenomenon in the plant, based on progress prediction information that is information on the progress of the plant predicted by the progress prediction system;
   a risk assessment system that assesses a risk of a fault in each of devices provided in the plant in a probabilistic manner;
   an abnormal phenomenon assessment system that assesses likelihood of occurrence of an abnormal phenomenon, based on abnormal phenomenon information that is information on the abnormal phenomenon specified by the abnormal phenomenon specification system, and fault probability information that is information on fault probability of the device assessed by the risk assessment system;
   wherein the risk assessment system acquires the fault information from the fault diagnosis system, re-assesses the risk of a fault in the device, and updates the fault probability information;
   wherein the risk assessment system includes a list of devices in which a device important to safety for the plant is extracted from the devices provided in the plant, selects the device corresponding to the fault information acquired from the fault diagnosis system based on the list of devices, and re-assesses the risk of a fault in the selected device;
   wherein the risk assessment system generates information on a human error probability of an operator based on previous human error information and assesses the risk in the plant on the basis of the re-assessed information on the fault probability of the device, the information on the list of devices, and the information on the human error probability of the operator, assesses the fault probability of the device, and generates the fault probability information; and
   wherein the abnormal phenomenon assessment system determines whether an emergency response is required against the abnormal phenomenon, based on the assessed likelihood of occurrence of the abnormal phenomenon, and when determining that the emergency response is required, the abnormal phenomenon assessment system outputs in real time notification information that is information on the abnormal phenomenon to at least one of the plant and a facility for managing the plant.

2. The plant assistance assessment system according to claim 1, wherein the abnormal phenomenon assessment system determines whether an emergency response is required against the abnormal phenomenon, based on the assessed likelihood of occurrence of the abnormal phenomenon, and when determining that the emergency response is not required, the abnormal phenomenon assessment system generates device replacement information for urging a user to replace the device that is causing the abnormal phenomenon to occur.

3. A plant assistance assessment method of acquiring plant data from a plurality of plants via a network communicable between each of the plants and a plant assistance facility provided at a location different from a location of the plant, and assessing the plant based on the plant data, the plant assistance assessment method comprising:
   monitoring an abnormality sign in the plant based on the plant data, and when the abnormality sign is detected, generating abnormality sign detection information that is information on the detected abnormality sign;
   performing fault diagnosis on each of devices provided in the plant, based on the generated abnormality sign detection information, and generating fault information that is information on a fault in the device;
   simulating progress of the plant, based on the generated fault information, predicting the progress of the plant, and generating progress prediction information that is information on the predicted progress of the plant;
   specifying a potential abnormal phenomenon in the plant, based on the generated progress prediction information, and generating abnormal phenomenon information that is information on the specified abnormal phenomenon;
   assessing a risk of a fault in the device provided in the plant in a probabilistic manner, and generating fault probability information that is information on assessed fault probability of the device;
   assessing likelihood of occurrence of an abnormal phenomenon, based on the generated abnormal phenomenon information and the generated fault probability information;
   acquiring the fault information from the fault diagnosis system, re-assessing the risk of a fault in the device, and updating the fault probability information; and
   extracting a list of devices in which a device important to safety for the plant from the devices provided in the plant, selecting the device corresponding to the fault information acquired from the fault diagnosis system based on the list of devices, and re-assessing the risk of a fault in the selected device;
   generating information on a human error probability of an operator based on previous human error information and, assessing the risk in the plant on the basis of the re-assessed information on the fault probability of the device, the information on the list of devices, and the information on the human error probability of the operator, assessing the fault probability of the device, and generating the fault probability information; and
   determining whether an emergency response is required against the abnormal phenomenon, based on the assessed likelihood of occurrence of the abnormal phenomenon, and when determining that the emergency response is required, outputting in real time notification information that is information on the abnormal phenomenon to at least one of the plant and a facility for managing the plant.

\* \* \* \* \*